United States Patent [19]
Goet

[11] Patent Number: 5,487,828
[45] Date of Patent: Jan. 30, 1996

[54] FILTRATION APPARATUS WITH EXCHANGEABLE FILTERS

[76] Inventor: Richard C. Goet, Prinseneiland 53, 1013 LM Amsterdam, Netherlands

[21] Appl. No.: 181,052

[22] Filed: Jan. 14, 1994

[30] Foreign Application Priority Data

Jan. 28, 1993 [NL] Netherlands ............................ 9300179

[51] Int. Cl.$^6$ ............................ B01D 27/10; B01D 29/96
[52] U.S. Cl. ............................ 210/90; 210/435; 210/450; 210/497.01; 55/498
[58] Field of Search ............................ 210/90, 136, 232, 210/236, 435, 443, 444, 450, 282, 497.01, 448, 445, 455; 55/498

[56] References Cited

U.S. PATENT DOCUMENTS

| | | | |
|---|---|---|---|
| 2,632,566 | 3/1953 | Morrison | 210/435 |
| 3,984,325 | 10/1976 | Rosaen | 210/236 |
| 4,272,368 | 6/1981 | Foord et al. | 210/90 |
| 4,686,038 | 8/1987 | Arnaud | 210/450 |
| 5,006,243 | 4/1991 | Arnaud | 210/448 |

FOREIGN PATENT DOCUMENTS 2541131  8/1984  France .

*Primary Examiner*—Joseph W. Drodge
*Attorney, Agent, or Firm*—Foley & Lardner

[57] ABSTRACT

A filtration apparatus with exchangeable filters for hygienic filtration of contaminated fluids. A tubular filter housing (1) has a central bore (2) as a receiving chamber for a filter cartridge. O-shaped rings (5,6) are mounted at the ends and in the center of the wall of the receiving chamber, and these prevent fluid from leaking around the filter. The filter housing has a fluid entrance opening (7), and an exit (8). The filter cartridge has a filter element (11) and two end caps (13 and 14). The rear end cap (13) has an annular opening (16) which provides an open connection with a filter chamber (12) within the filter element. In an assembled state, the fluid entrance (7) is aligned with the annular opening (16) in the filter chamber. Contaminated fluid is drawn through entrance (7) and proceeds through the filter to fluid exit (8). The replacement of the filter cartridge takes place by pressing in a new filter cartridge at the top of the filter housing, which causes the pressing out of soiled filter at the underside of the housing, without needing any contact of the soiled filter by hand.

7 Claims, 2 Drawing Sheets

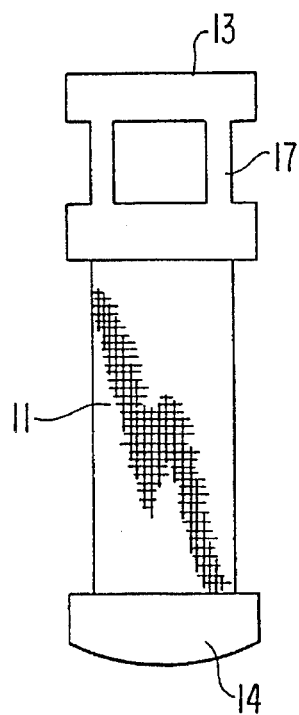
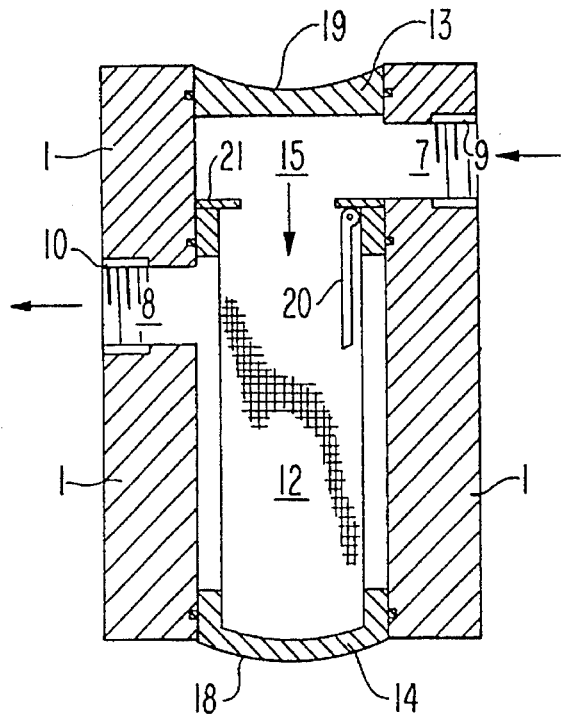
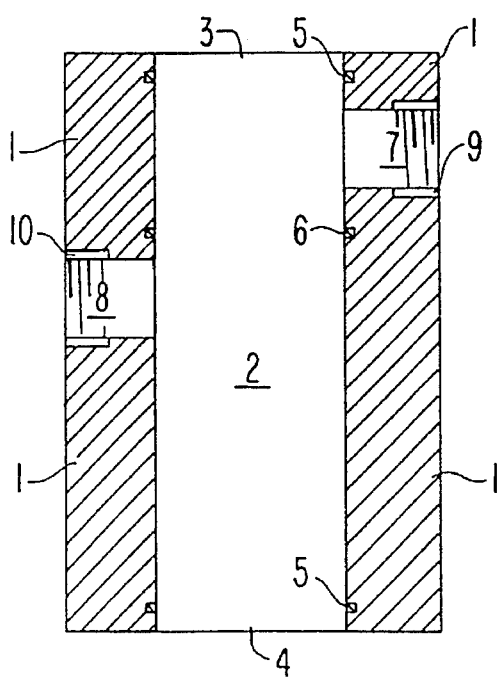
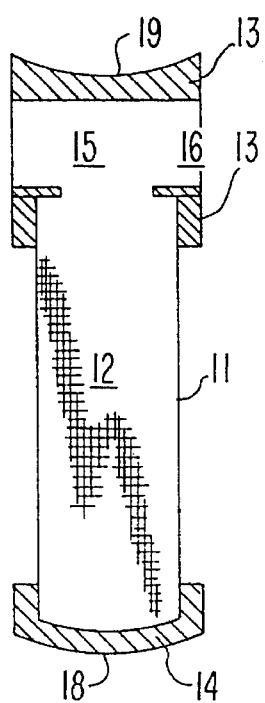

FILTRATION APPARATUS WITH EXCHANGEABLE FILTERS

BACKGROUND OF THE INVENTION

The invention relates to a filtration apparatus with exchangeable filters for the filtration of fluids contaminated with solid particles. The apparatus comprising a tubular filter housing of fluid-impermeable material, provided with an extending central bore, intended for the receiving therein of filter cartridges that can be slided in and out of the bare. The filter housing has a fluid entrance opening and a fluid exit opening, which have been provided in the tube walls of the filter housing in relative displacement to each other, and interchangeable filter cartridges, each one consisting of a hollow, tubular filter element that encloses a filter chamber, closed at the front and rear ends by end caps of fluid-impermeable material, of which the outer circumferences have been adapted to the size of the central bore in the filter housing, and with the one end cap having an opening in communication with the filter chamber of the filter element, which, with proper positioning of the filter cartridge in the central bore of the filter housing, provides an open connection with the one of the entrance and exit openings of the filter housing, while the other one provides an open connection with the outer wall of the filter element, and with seals between the end caps and the inner wall of the central bore ensuring that the fluid communication between the entrance and exit openings is only through the filter.

Such a filtration apparatus is known from the U.S. Pat. No. 3,984,325 to Rosaen. A cylindrical, tubular filter housing is used in this known apparatus, of which the central bore is capable of receiving several, at least two, filter cartridges. The fluid entrance and exit openings have been provided approximately in the centre of the filter housing. Each filter cartridge has a rear end cap that is provided with a central screw bore. The front end cap, which seals the filter cartridge, has a narrowed screw piece at its front end, which is intended to be screwed on to the rear end cap of a filter cartridge lying in front of it. This screw piece is hollow, with this cavity having a side-wise extension towards the outside at the rear side. In case two such filter cartridges screwed together are within the cylindrical, tubular filter housing, then there is an annular cavity, which is in connection with the internal space of the filter element, between the rear end cap of the filter element at the front and the front end cap of the filter element at the rear. This annular cavity forms an annular channel together with the inner wall of the central bore, which, with a proper positioning of the filter cartridges, lies just in front of the one of the entrance and exit openings, while the other one of these openings is in communication with the outer wall of the filter element, so that fluid communication between the entrance and exit openings through the filter is possible.

Each filter cartridge is further provided with seals in the form of O-shaped rings in each of the end caps of a filter cartridge.

With this filter apparatus it is possible to continue fluid filtration without interruption, even when a soiled filter is to be exchanged. During operation there are always two filter cartridges in the filter housing, of which the front one is used and the rear one is on stand-by. When the filter at the front is contaminated to the extent that it must be exchanged, then a new filter cartridge is introduced at the rear end of the filter housing, and screwed onto the the rear of the filter cartridges present in the housing, and subsequently pushed through, by which the contaminated filter is pushed forwards, and can be screwed loose and removed, while the filter cartridge lying just behind has now taken over the filtration function.

Although this known filtration apparatus has the advantage that a new, clean filter cartridge can be introduced during operation, it exhibits a number of disadvantages. For example, it is not suitable for applications in which coarse pollutants must be filtered from a fluid, such as with filtrations during applications in hospitals, dentists' clinics, and such. A dental application often involves rinsing water, which, for example, contains amalgam grindings, and in case the fluid is let in through opening 14 of the Rosaen filter device, these amalgam grindings, both fine and coarse, will rapidly clog the space 46 between this entrance opening and the filter element 28 during use. In the opposite case, in case the entrance of fluid of the rinsing water occurs through opening 16, the annular space 54 shall clog rapidly, so that the filter element proper cannot be used effectively.

Another disadvantage is that during the exchange of a filter a new filter to be introduced must be screwed on with a probability that this screwing on does not occur properly, while the soiled filter cartridge coming out must be screwed loose, which implies that the soiled filter must be held by hand, and when this screwing off takes place with some force, there moreover is a probability that an operation glove is damaged, and that, for example, in the case of a filtrate of blood and saliva, infection can occur.

SUMMARY OF THE INVENTION

It is now the object of the invention to provide a filtration apparatus, in which the advantages offered by the apparatus according to the U.S. Patent publication are retained completely, but with which the above-mentioned disadvantages have been solved.

To that end the invention provides a filtration apparatus with exchangeable filters with the characterization that the lengths of the filter housing and central bore correspond substantially to the length of the filter cartridge, and that the opening in the one end cap of the filter cartridge is a substantially annular side opening in the circumferential wall thereof, with the width of the annular opening is corresponding substantially to the diameter of the entrance opening in the filter housing.

The filtration apparatus according to the invention has a particularly simple construction, both with regard to the embodiment of the filter housing, as well as to the filter cartridges to be used with it. The use of an end cap with a substantially annular circumferential opening (substantially, because naturally a pair of cross-connections are required) offers a great advantage that instead of the annular channel 54 according to the U.S. Patent to Rosaen, there is an annular open space, in which the probability of clogging by amalgam is substantially excluded. The exchanging of a used filter cartridge with a new one occurs in a very simple fashion by placing a new filter cartridge and susbsequently pushing it through into the filter housing, by which the old filter cartridge is pushed out and it falls out of the filter housing into a suitable storage reservoir or something similar. With this the probability of some contact occurring between the surgeon or dentist or other medical personnel and the contaminated filter cartridge, is excluded completely.

The filtration apparatus according to the invention can effectively be embodied such that the fluid entrance opening of the filter housing is located near the insertion end of the central bore, and that the fluid exit opening is shifted diametrically opposite to it towards the central portion of the central bore, and that each filter cartridge has a sealing end cap at its front end, respectively insertion end, and the end cap with the annular opening at its rear end, respectively discharge end. Preferably, the arrangement is vertical, that is, the filter housing stands upright, and new filter cartridges are inserted at the top and are pushed out at the bottom.

According to the invention a suitable sealing is obtained as, with mounted filter cartridges, sealing O-shaped rings are located near the discharge end and near the insertion end of the central bore between the respective end caps of the filter cartridge and the inner wall of the central bore, and that a third O-shaped ring is located at the level of the rear end cap between the annular opening of this end cap and the fluid exit of the central bore. With this it is preferable that the O-shaped rings are laid in grooves in the inner wall of the central bore in the filter housing. This provides a great advantage that in fact only three O-shaped rings are required, and not -as with the apparatus according to the U.S. Patent- four rings, which moreover have to be interchanged because these are located on the filter cartridges and not at the central bore itself.

For easy positioning it is furthermore preferable that the end cap at the front side, respectively insertion side of each filter cartridge has a convex front surface, and that the end cap at the rear side has a corresponding concave surface.

Furthermore, the embodiment can be such that the filter cartridge has an one-way valve between the bottom edge of the annular opening and the end of the hollow internal space of the filter element connecting to it. This is especially important when the filter housing is arranged not vertically, but horizontally, in which case a back flow can occur during a sudden shutting-off of the filter operation.

It is further possible to provide the appaartus with a suitable type of differential pressure indicator which provides a signal or indication, when the pressure difference between the fluid entrance and the fluid exit exceeds a predetermined threshold value, that a filter in usage is getting clogged, and that a new filter cartridge needs to be inserted.

BRIEF DESCRIPTION OF THE DRAWINGS

Following on the invention will be illustrated in more detail by way of an example of an embodiment, with reference to the drawings. Shown in:

FIGS. 2 and 2A are side views of a filter cartridge which is to be inserted in the filter housing indicated underneath it, and FIGS. 3 and 3A are cross-sectional side views of the filter housing with filter cartridge during operation with a filter cartridge pushed out underneath.

Similar reference numerals have been used in the figures for corresponding members.

DESCRIPTION OF THE PREFERRED EMBODIMENTS

Figure 1:
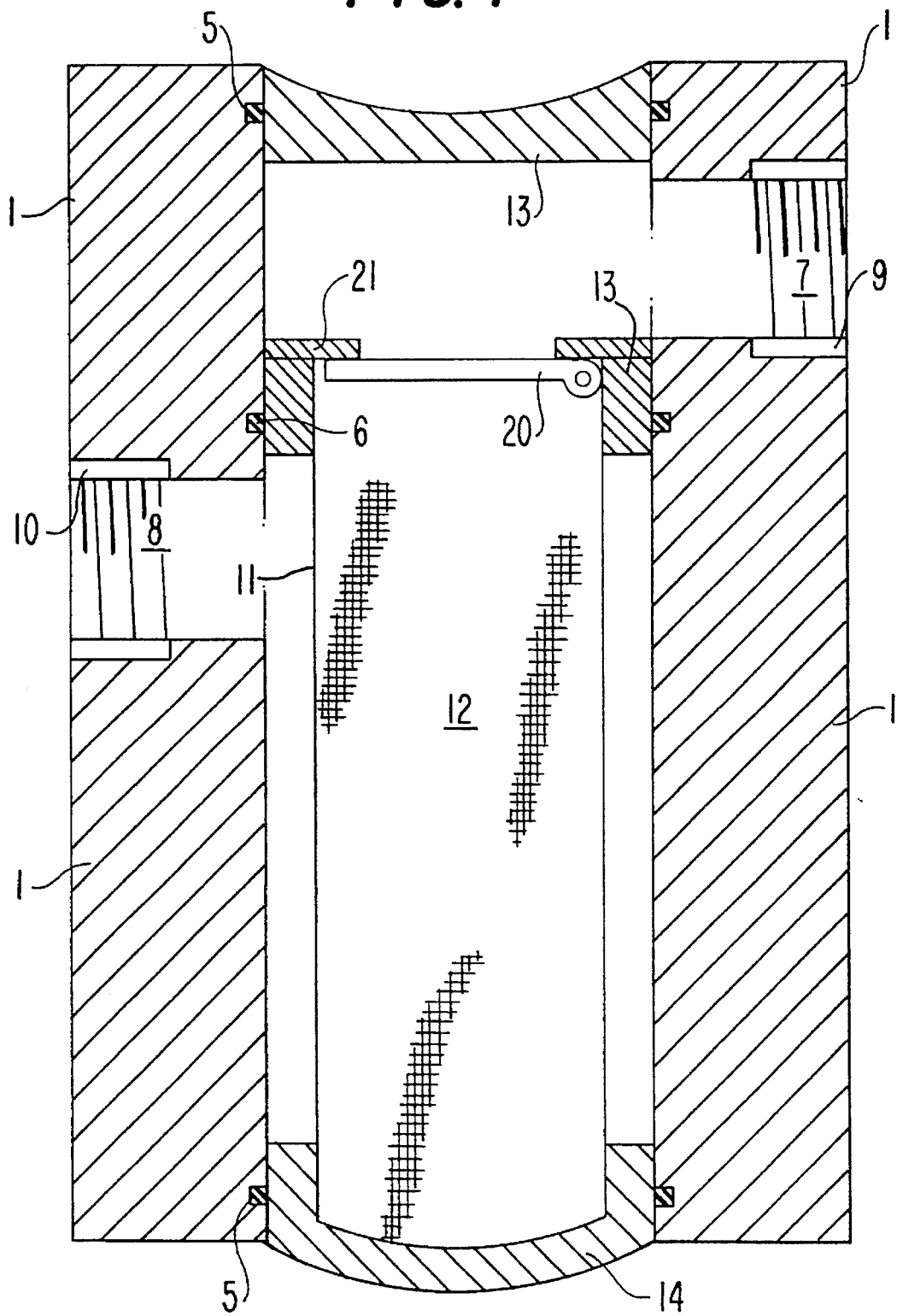
FIG. 1 is a cross-sectional side view of an embodiment according to the invention of a filter housing with a filter cartridge mounted in it.

In the illustrated embodiment the filtration apparatus according to the invention has a vertically positioned, tubular filter housing, which comprises a short tube segment of suitable fluid-impermeable material, for example stainless steel, aluminium, or plastic, of which the tube wall 1 has a central bore, which forms a receiving chamber 2 for the filter cartridges to be inserted. This receiving chamber is open at both ends 3 and 4, and forms an extending channel, with which a filter cartridge can be inserted at the top side 3 and can be pushed out at the bottom side 4. In principle the tubular filter housing can have any cross-section, but it is preferably circular. The receiving chamber 2 is provided with O-shaped rings 5 internally near both its open ends 3 and 4, while there is an O-shaped ring 6 more towards the centre. A fluid entrance opening 7 is provided in the tube wall 1 of the filter housing near the top end 3 of the receiving chamber, while a fluid exit opening 8 is located underneath and diametrically across the entrance 7. Fluid lines can be connected to the fluid entrance 7 and the fluid exit 8 by means of a threaded entrance 9 at the entrance respectively a threaded exit 10 at the exit. As can be seen, the O-shaped ring 5 is located between both O-rings 6 at a position, lying between the fluid entrance 7 and the fluid exit 8.

A filter cartridge for use with this filtration apparatus comprises a hollow, tubular filter element 11, of which the filter wall has been reinforced with gauze or something similar, and of which the filter material encloses a filter chamber 12, which is sealed by an upper end cap 13 and a lower end cap 14. The circumferential sizes of these end caps are adapted to the inner diameter of the receiving chamber, so that a filter cartridge can be slided fittingly into the filter chamber 2 through the top opening 3. The end caps 13 and 14 are made of suitable fluid-impermeable material, and the bottom end cap 14 forms a seal for the filter chamber 12.

A substantially annular side opening 16 is provided in the circumferential surface of the upper end cap 13, which is manufactured to be longer than the lower end cap 14. This annular opening 16 surrounds the inner space in the upper end cap, which forms a front chamber 15, which is in connection with the filter chamber 12 of the filter element 11. Some cross members 17 are required to ensure that the integrity of the upper end cap 13 is maintained.

The entrance openings 7 and 8 for the fluid to be filtered are located at positions in the tube wall of the filter housing, such that when a filter cartridge with the end cap 14 facing downwards is inserted in the opening 3 of the filter housing till the lower end cap adjoins the bottom edge of the filter housing, the annular opening 16 of the upper end cap 13 lies in line, and therefore in connection, with the fluid entrance Y, while the filter element 11 is in open communication with the exit 8.

The apparatus described above functions as follows. Prior to the filtration of contaminated fluid, for example, of rinsing water, containing amalgam, of a dental treatment, a filter cartridge with its end cap 14 facing downwards is slided through opening B of the filter housing into the receiving chamber 2 of the filter housing. When the filter cartridge is located in position, then the front chamber 15 in the upper end cap 13 with the annular opening 16 is in connection with the entrance 7 of the filter housing. As can be seen, the filter itself is in communication with the exit 8. The various sealings in the form of O-shaped rings 5 and 6 ensure that fluid, entering through Y, can only receed through 8 after having passed the filter. Supply and discharge lines (not shown) are connected to the entrance and the exit through screw entrances. One can subsequently filter by pumping fluid through 7 to 8 by means of a pump, during which this fluid is filtered in the filter chamber 12, and the filtered fluid discharges from 8 into the discharge line. In due course, or after, in one way or another, for example by means of a differential pressure indicator (not shown), a too high difference in pressure between the fluid entrance and the fluid exit indicates that the filter in operation is getting clogged such that it is not functioning properly any more, a new filter cartridge is inserted from the top (FIG. 2). The used filter is pushed through with the aid of this new filter, so that it (the used filter) falls out through 4 at the underside and can be collected in a suitable container. Then the new filter is in place of the old one, and it can carry on with the intended filtering function.

To facilitate the replacing of the filter, the lower end cap 14 of the filter cartridge is provided with a convex end surface 18, while the rear face 19 of the upper end cap 13 is shaped concavely in adaptation to it. The convex surface 18 forms a suitable aid for the insertion of a new filter cartridge on top of a used one, with this surface functioning as a "finder".

The filter cartridges can further be provided with a one-way valve 20, which cooperates with a valve edge 21, that limits the front chamber 15 towards the filter chamber 12. This one-way valve is in general not required in the vertical arrangement, as shown in the embodiment, but in case one were to work with a horizontal filter housing, such a one-way valve would be very effective in preventing a reverse flow of contaminated fluid. The one-way valve can be of further use if the used cartridges are kept in a lying position, since there would also be a probability that the filtered contaminants could come from the filter chamber 12.

One attains a great advantage with a filtration apparatus as the one described above, in that filtration can be conducted safely and hygienically, with used filter cartridges being able to be interchanged easily and quickly, and with complete avoidance of any contact between hand and used, and therefore contaminated, filter cartridge, since these used filter cartridges can be collected usually in a suitable reservoir after being pushed out.

Although the invention mentioned above has been described by means of an example of a practical embodiment, it will be clear that numerous variations and modifications are possible without departing from the scope of this invention. For example, it is possible to provide the filter housing with a differential pressure indicator, which measures the difference in pressure between the fluid entrance and the fluid exit. When the difference in pressure becomes too large, then this indicates that the filter in operation is starting to get clogged, and that it needs to be replaced. This can, for example, be indicated by a bulb lighting up, or by a change in colour.

Furthermore it is possible to replace the O-shaped ring isolation (5 and 6) by any other suitable means; or to fit these O-shaped rings on the outer walls of the end caps of the filter cartridges instead of in the receiving chamber 2 of the filter housing.

The filtration apparatus according to the invention lends itself for numerous applications, especially those in which reliable and particularly hygienic filtration is required. Eventual infection hazard is reduced, in particular in medical and dental applications.

The choice of the filter materials co-determines the field of application. Filtration of fine amalgam from rinsing water was stated as an example of a dental application. Other fields of application will be clear from the aforementioned.

I claim:

1. A filtration apparatus with exchangeable filters for filtration of fluids contaminated with solid particles, comprising:

a tubular filter housing of fluid-impermeable material, the housing having a tube wall and a central bore of equal length, the central bore configured for slideably receiving filter cartridges, the central bore having an insertion end, central portion, and discharge end;

a fluid entrance opening provided in the tube wall at the insertion end of the central bore;

a fluid exit opening provided in the tube wall at the central portion of the central bore, the fluid exit opening being diametrically opposed to the fluid entrance opening in the tube wall;

an interchangeable filter cartridge disposed in and substantially the same length as the central bore, the filter cartridge having a first end cap, a second end cap and a hollow, tubular filter element that includes an outer wall, a front end, and a rear end for enclosing a filter chamber, the first end cap being sealed on the front end of the filter element and the second cap being sealed on the rear of the filter element, so that the first end cap and second end cap of the interchangeable cartridge provide end caps for the central bore;

wherein the first end cap sealed on the front end provides an open connection with the outer wall of the filter element, the first end cap being of fluid-impermeable material and sized to match the size of the central bore;

wherein the second end cap sealed on the rear end has an annular opening which communicates with the filter chamber and the fluid entrance opening to establish an open fluid connection, the annular opening being provided with a side opening having a size equal to the size of the fluid entrance opening, the second cap being of fluid-impermeable material and sized to match the size of the central bore;

wherein at least one seal is provided, respectively, between each of the first end cap and second end cap and an inner wall of the tube wall for ensuring that fluid communication through the housing exists only between the fluid entrance opening, the filter cartridge and fluid exit opening; and wherein the fluid communication between the filter cartridge and the fluid exit opening occurs only through the outer wall of the filter element.

2. A filtration apparatus according to claim 1, wherein the seals comprise O-shaped rings located at the discharge end and the insertion end of the central bore between the respective first and second end caps and the inner wall of the central bore, and an additional O-shaped ring located at a level of the second end cap between the annular opening and the fluid exit opening.

3. A filtration apparatus according to claim 2, wherein the O-shaped rings are laid in grooves in the inner wall of the central bore in the filter housing.

4. A filtration apparatus according to claim 1, wherein the filter cartridge comprises a one-way valve between a bottom edge of the annular opening of the second end cap and an end of a hollow internal space of the filter element.

5. A filtration apparatus according to claim 1, wherein the filter housing is provided with a differential pressure indicator which provides at least one of a signal and an indication when a pressure difference between the fluid entrance opening and the fluid exit opening exceeds a predetermined threshold value.

6. A filtration apparatus with exchangeable filters for filtration of fluids contaminated with solid particles, comprising:

a tubular filter housing of fluid-impermeable material, the housing having a tube wall and a central bore of equal length, the central bore configured for slideably receiving filter cartridges, the central bore having an insertion end, central portion, and discharge end;

a fluid entrance opening provided in the tube wall at the insertion end of the central bore;

a fluid exit opening provided in the tube wall at the central portion of the central bore, the fluid exit opening being diametrically opposed to the fluid entrance opening in the tube wall;

an interchangeable filter cartridge disposed in and substantially the same length as the central bore, the filter cartridge having a hollow, tubular filter element that encloses a filter chamber, the filter element having an outer wall, a front end, and a rear end;

a first end cap sealed on the front end to provide an open connection with an outer wall of the filter element, the first end cap being of fluid-impermeable material and sized to match the size of the central bore;

a second end cap sealed on the rear end, the second end cap having an annular opening which communicates with the filter chamber and the fluid entrance opening to establish an open fluid connection, the annular opening being provided with a side opening having a size equal to the size of the fluid entrance opening, the second cap being of fluid-impermeable material and sized to match the size of the central bore; and at least one seal provided, respectively, between each of the first end cap and second end cap and an inner wall of the tube wall for ensuring that fluid communication through the housing exists only between the fluid entrance opening, the filter cartridge and fluid exit opening;

wherein the first end cap has a convex front surface and the second end cap has a corresponding concave rear surface.

7. A filtration apparatus with exchangeable filters for filtration of fluids contaminated with solid particles, comprising:

a tubular filter housing of fluid-impermeable material, the housing having a tube wall and a central bore, the central bore configured for slideably receiving filter cartridges, the central bore having an insertion end, central portion, and discharge end;

a fluid entrance opening and fluid exit opening provided in the tube wall;

an interchangeable filter cartridge disposed in the and substantially the same length as the central bore, the filter cartridge having a hollow, tubular filter element that encloses a filter chamber, the filter element having an outer wall, a front wall, and a rear end;

a first end cap sealed on the front end to provide an open connection with an outer wall of the filter element, the first end cap being of fluid impermeable material and sized to match the size of the central bore;

a second end cap sealed on the rear end, the second end cap having an annular opening which communicates with the filter chamber and the fluid entrance opening to establish an open fluid connection, the annular opening being provided with a side opening having a size equal to the size of the fluid entrance opening, the second cap being of fluid-impermeable material and sized to match the size of the central bore; and at least one seal provided, respectively, between each of the first end cap and second end cap and an inner wall of the tube wall for ensuring that fluid communication through the housing exists only between the fluid entrance opening, the filter cartridge and fluid exit opening;

wherein the first end cap has a convex front surface and the second end cap has a corresponding concave rear surface.

* * * * *